United States Patent [19]

Mansfield

[11] Patent Number: 4,711,447

[45] Date of Patent: Dec. 8, 1987

[54] EXERCISE APPARATUS FOR USE WITH VIDEO GAME

[76] Inventor: Michael R. Mansfield, 3150 Shorewood La., #302, Fort Myers, Fla. 33907

[21] Appl. No.: 812,317

[22] Filed: Dec. 23, 1985

[51] Int. Cl.$^4$ .................... A63B 21/00; A63G 31/16
[52] U.S. Cl. ........................ 272/73; 272/17; 272/18; 273/DIG. 28
[58] Field of Search .............. 272/16, 17, 18, 73, 272/129, 1 C, DIG. 5, 72, 146; 273/DIG. 28, 148 B; 128/25 R

[56] References Cited

U.S. PATENT DOCUMENTS

| | | | |
|---|---|---|---|
| 3,830,491 | 8/1974 | Christians | 272/1 C |
| 4,461,470 | 7/1984 | Astroth et al. | 272/17 |
| 4,478,407 | 10/1984 | Manabe | 272/18 |
| 4,512,567 | 4/1985 | Phillips | 272/73 |
| 4,630,817 | 12/1986 | Buckley | 272/73 |

FOREIGN PATENT DOCUMENTS 2038597 7/1980 United Kingdom ................ 272/146

Primary Examiner—Richard J. Apley
Assistant Examiner—S. R. Crow
Attorney, Agent, or Firm—Elsie T. Apthorp

[57] ABSTRACT

An exercise apparatus for use in combination with a video game having a chair for a player mounted in a structural assembly which tilts back or forth in response to pushing or pulling, respectively, on a handlebar, and which rotates horizontally in two directions in response to pedaling backwards or forwards of a cycle mechanism. The position of the chair and assembly is measured by electrical devices for utilization by a computer with video screen controlled by a video game program. The resistance encountered by the operator in pedaling and in pushing or pulling on the handlebar is variable by mechanical friction devices so that the operator may adjust the level of his or her physical exertion required to play the video game.

3 Claims, 5 Drawing Figures

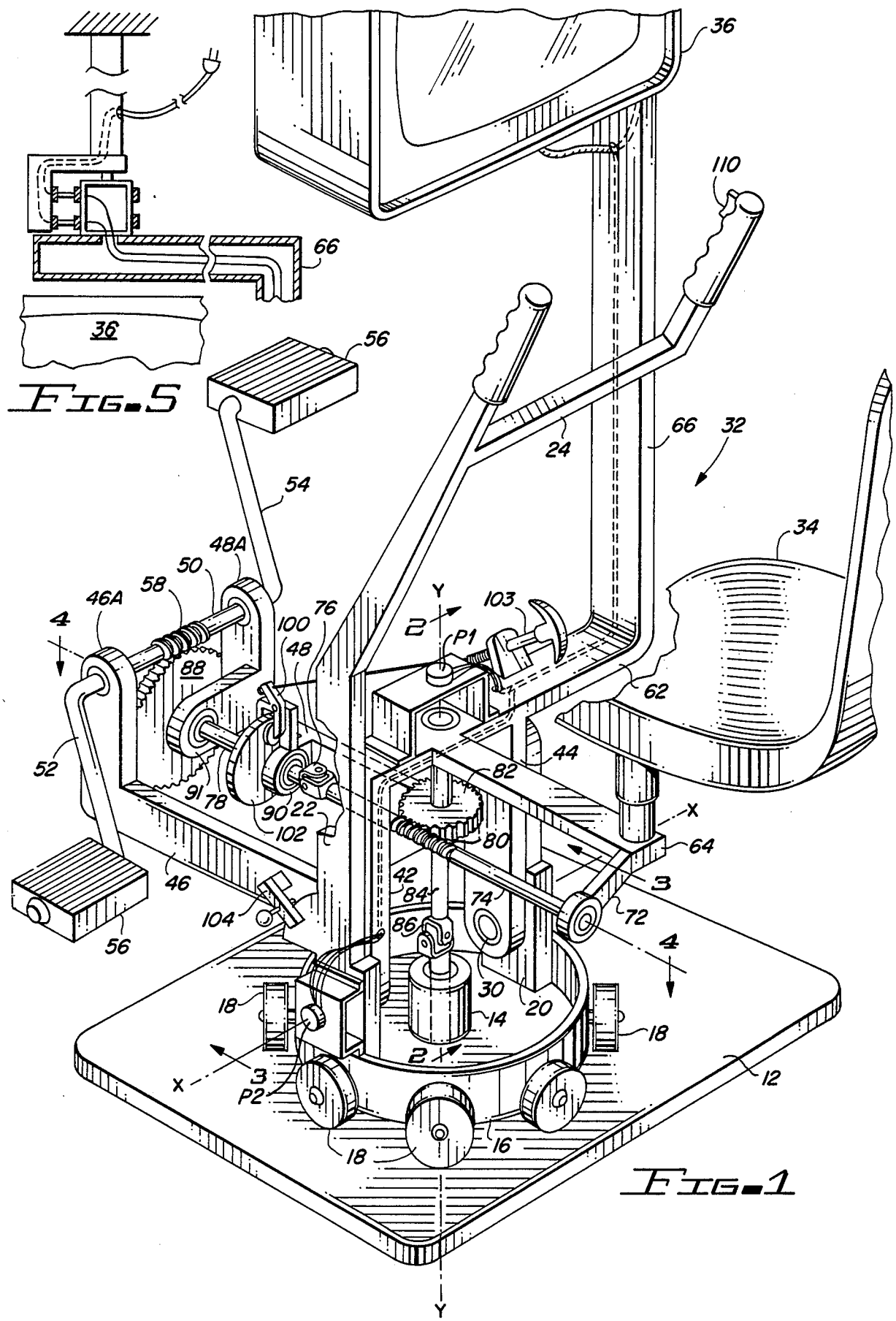

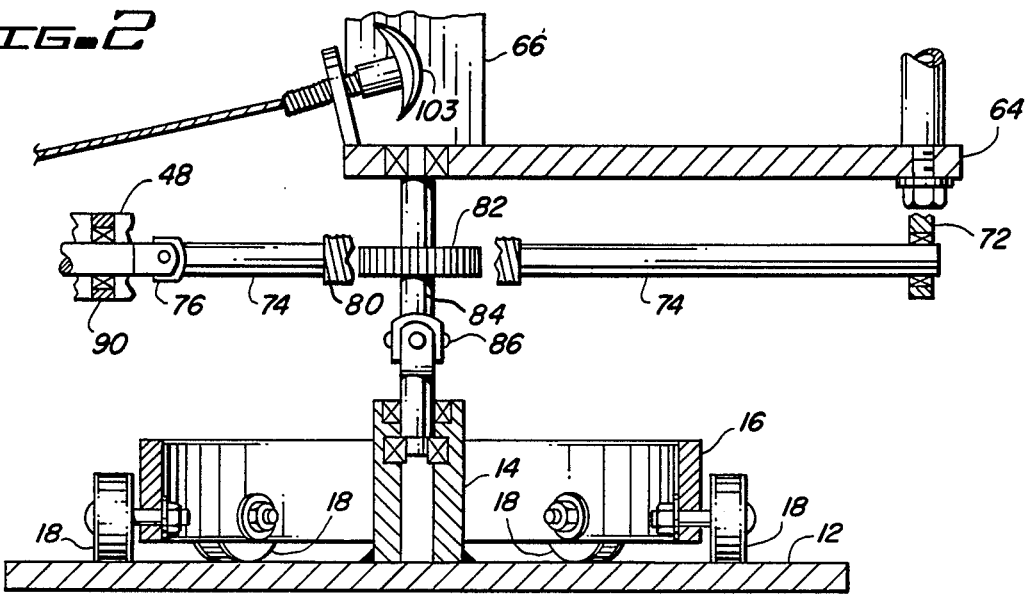
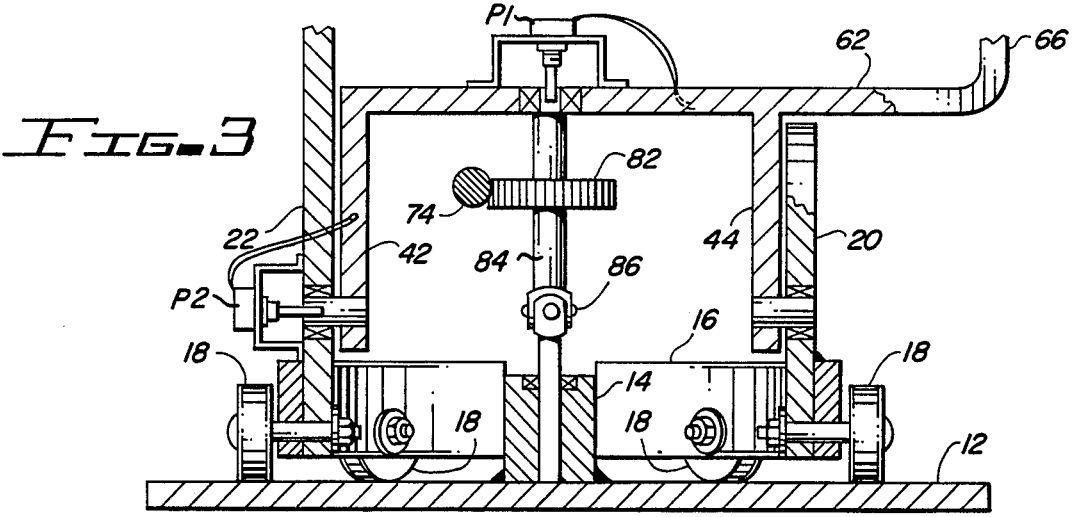
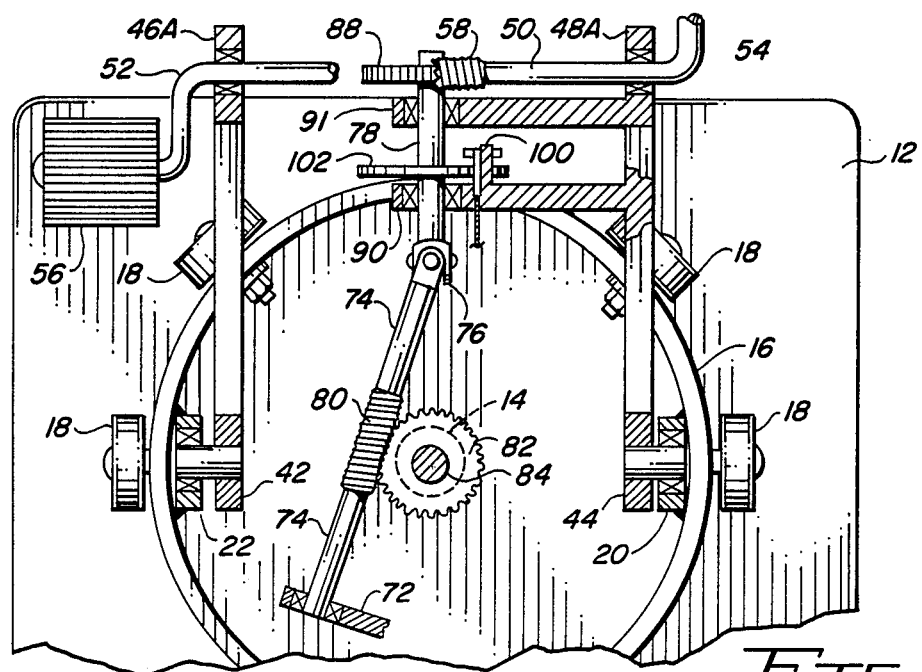

EXERCISE APPARATUS FOR USE WITH VIDEO GAME

BACKGROUND OF THE INVENTION

Field of the Invention

This invention relates to an exercise machine, and more particularly to an exercise machine integrated in operation with a video game generating targets on a screen for the operator to destroy when he maneuvers himself, through use of the exercise devices, into firing position.

The prior art includes many varieties of exercise machines: exercycles, rowing machines, and weight-lifting machines found in fitness centers. None of these has a video game which is connected to the machine. There are a multitude of video games on the market which incorporate randomly generated targets to be "destroyed" by the operator by manipulation of hand controls by the operator. The operation of these games is almost effortless, with respect to the expenditure of physical energy by the operator; there are none that can be employed to achieve an optimal aerobic level of physical exertion for cardiovascular conditioning.

There are also known various monitor game machines which simulate such activities as the flight of an airplane attacking enemy bombers, driving a car at high speed through traffic or in a race or obstacle course, and the like. These devices may employ a video unit comprised of a computer, program, and video screen. The cockpit or seat of the operator typically will tilt, rotate, or otherwise move in response to controls manipulated by the operator. The object of these inventions is to provide realism to video games. Two such inventions are U.S. Pat. No. 4,461,470 Astroth, dated 7-24-84, and U.S. Pat. No. 4,478,407, Manabe, dated 10-23-84. However, the prior art does not include a simulator which provides the opportunity for strenuous exercise by the operator.

SUMMARY OF THE INVENTION

It is an object of the present invention to provide an exercise apparatus integrated with a video game which includes a programming means which causes pre-determined but variable sequence of views to be displayed on the screen, which views are manipulated into a desired position on the screen by vigorous arm and leg operation of the exercise machine, so that when the views are in the desired position they may be obliterated from the screen with a trigger switch, the entire apparatus being designed to provide amusement and relief from the monotony and boredom usually associated with exercise machines.

Another object of this invention is to provide variable resistance applicable to the parts movable by leg and arm movement so as to increase or decrease the amount of exertion required to operate the device; the operator can achieve the optimum level of aerobic exercise.

Another object is to provide an exercise device that may be operated indoors.

Another object is to provide an exercise device with a stationary base so that its operation does not require space additional to that which it occupies at rest.

Another object is to provide an exercise device that requires no special expertise to operate.

Another object is to provide an exercise device that is safe enough for the average adult and for any child able to rise a bicycle.

Another object is to provide an exercise device that is readily affordable by fitness centers, and eventually to achieve low enough cost for the home market when the unit price is low enough.

Another object is to construct the device from conventional, commercially available components.

BRIEF DESCRIPTION OF THE DRAWINGS

FIG. 1 is a perspective view of the preferred embodiment of my invention;

FIG. 2 is a cross-sectional view taken along the plane 2—2 of FIG. 1;

FIG. 3 is a cross-sectional view taken along the plane 3—3;

FIG. 4 is cross-sectional view taken along the plane 4—4;

FIG. 5 is a cross-sectional view of a conventional slip ring and brush assembly, the overhead power supply connection for the invention.

DETAILED DESCRIPTION OF THE DRAWINGS

In FIG. 1 it will be seen that I have provided by video game exercise machine 10 which is disposed upon a mounting base 12. Centrally located on mounting base 12 is a vertical member 14 serving as a central pivot point about which my machine is rotatable.

A ring-shaped member 16, equipped with a number of spaced wheels 18, is arranged to rotate in either direction about the mounting base 12 at the behest of the operator. The ring-shaped member 16 serves as a support for a pair of vertical members spaced approximately 180 degrees apart on the ring-shaped member 16.

One of these vertical members is a comparatively short member 20, whereas the other vertical member is an elongate member 22 extending upwardly for a substantial distance in order to form a handlebar member 24 which the user may push or pull during operation of my device.

A pivot axis 30 is defined passing through the lower portion of member 22 as well as through the upper portion of short support member 20, and through universal joint 86, described hereinafter, and it is about this pivot point that structural assembly 32 is supported. As will be described in greater detail hereinafter, the structural assembly 32 serves to support the operator's seat 34 as well as the video game unit 36, comprising a console with programmed computer means and a cathode ray display screen.

The tilting movements of the structural assembly 32 are significant, so I prefer to mount a potentiometer P2 on the base of member 22 at a location coincident with the pivot axis 30. The potentiometer is supplied with an operating voltage from the computer contained in the video game unit 36 and transmits positional data concerning the position of structural assembly 32 to the computer.

The structural assembly 32 includes vertical structural members 42 and 44 that serve as supports for members 46 and 48 that are spaced apart and disposed in a plane generally parallel to the plane of the base member 12. Upward extensions 46A and 48A are located at the ends of members 46 and 48, with aligned apertures in the members 46A and 48A serving as supports for rotatable member 50. Mounted in opposed relation at the ends of rotatable member 50 are cranks 52 and 54, with pedal members 56 being pivotally mounted in a conventional manner on the ends of the cranks 52 and 54. Members 46 and 48 are chosen to be of a length such that the feet of the operator seated in chair 34 can readily reach the pedals 56.

Disposed above the plane of the members 46 and 48 is a generally horizontally disposed member 62 extending between vertical members 42 and 44, and it is at the approximate midpoint between vertical members 42 and 44 that a seat- or chair-supporting structural member 64 is secured, with member 64 being generally parallel to horizontally disposed members 46 and 48. From the outboard end of member 62 is an upstanding member 66 that serves as support for the vidoe game unit 36.

Supported laterally away from a position near the end of seat supporting member 64 is a lateral member 72 having at its outboard end means forming a rotatable support for worm shaft 74. The opposite end of worm shaft 74 is connected by a universal joint 76 to drive shaft 78 associated with the pedals. More of the latter detail will be described shortly.

Approximately at a midpoint location on worm shaft 74 is cut a worm gear 80, which is in mesh with worm wheel 82. Worm wheel 82 is fixed to vertically disposed shaft 84 that is connected by means of universal joint 86 to the upper portion of vertical member 14, previously described as the member about which ring member 16 is rotatable.

It is important to note that U joint 86 permits tilting type movements of the shaft 84 with respect to the member 14, but does not permit rotation. As a result of this arrangement, rotation of worm shaft 74, because of pedalling, causes worm shaft 74, which includes worm gear 80, to revolve around worm wheel 82, and causes the assembly 32 as well as the ring-shaped member 16 to move in rotation with respect to mounting base 12.

In order for the entire assembly 32 to tilt relative to members 20, 22, 24 and 14, it is essential that U joint 86 be in line with horizontal axis X or 30, as well as vertical axis Y.

Because the vertically disposed shaft 84 is in effect non-rotative, a potentiometer P1 mounted at the intersection of the upper end of shaft 84 with horizontally disposed member 62 serves to obtain a readout of radial position of assembly 32 in respect to shaft 84 and base 12, which information is provided electrically to a digital/analog converter in the computer located in the video game unit 36.

Further inspection of FIG. 1 reveals that a worm gear 58 is cut into shaft 50 at the approximate midpoint between upstanding structural support members 46A and 48A with rotation of worm gear 58 causing rotation of worm wheel 88. A drive shaft 78 is rotatably supported by a pair of support members 90 and 91 attached to member 48 such that shaft 78 is approximately parallel to support members 46 and 48. Therefore as the operator causes rotation of shaft 50 by pedal movement in the selected direction, rotative motion is transmitted via universal joint 76 to worm shaft 74. This rotation causes worm gear 82 and shaft 74 to work their way or revolve around worm wheel 82. Inasmuch as universal joint 86 has been previously described as forming a non-rotative juncture with upstanding member 14, this pedal movement brings about rotation of the ring member 16 in a direction that is directly relatable to the direction in which the operator drives the pedals 56.

Inasmuch as the structural assembly 32 is capable of 360 degrees of rotation relative to the mounting base 12, it is necessary that electric power to my invention be delivered via overhead cable 92 utilizing a conventional brush and slip-ring assembly having 360 degrees of rotational freedom. Power to the computer is be provided through said assembly by overhead cable from a conventional 115-120 volt ac outlet. The computer provides 5 volts of power to each of the potentiometers, P1 and P2, via wiring routed along structural members 66, 62, and 22. Wiring for the trigger switch 110 is routed upward from member 62 along member 22 to member 24 and from thence to the trigger switch.

The structural members of my invention, particularly 20, 22, 24, 62, and 66, may be fabricated of hollow tubular steel so that electrical wiring from the two potentiometers and the trigger switch may be led internally through these members.

In order to vary the resistance of the cranks 52 and 54 to pedaling by the operator, so that an aerobic level of exercise may be achieved, I have provided a spring-loaded caliper-type brake 100 mounted on horizontal member 48, which brake operates on disc 102 mounted on drive shaft 78 between the apertures through support members 90 and 91. Similarly, to provide variable resistance to the pushing and pulling of the handlebar by the operator, a friction-type brake 104 is mounted on horizontal support member 46 and applies pressure to ring-shaped member 16. Brakes 100 and 104 are manually operated and are within arm's length of the operator seated in seat 34.

It is contemplated that the preferred embodiment of my invention will employ a video game comprising a computer programmed to cause a predetermined and variable sequence of views to be displayed on the display screen of video unit 36. For example, a program which involves a programmed slowly moving target and a wapon that is controlled by the operator will be discussed to explain the operation of my invention. When a view of the target appears on the screen, the user can manipulate handlebar 24 and pedals 56 to cause structural assembly 32 to tilt forward or backward and to rotate in a horizontal plane. The horizontal rotation possible with this invention is 360 degrees. The forward and backward tilting of the assembly occurs through a maximum arc of 90 degrees. Tilting and rotational movements of the assembly will operate potentiometers P1 and P2 to cause the weapon on the screen to move correspondingly. For example, when the operator pedals forward, structural assembly 32 will be rotated clockwise and the weapon on the screen will move to the right. Conversely, when the operator pedals backwards assembly 32 will rotate counterclockwise and the weapon on the screen will move to the left. By pushing on handlebar 24, the operator will tilt assembly 32 away from the handlebar, which will cause the weapon to move upward on the screen. By pulling on handlebar 24, the operator tilts the assembly toward the handlebar 24 with a corresponding movement of the weapon downward on the screen. When the position of the weapon corresponds with that of the taret on the screen the operator may fire a trigger switch 110 mounted on handlebar 24 which will cause the target to appear to explode on the screen and to disappear.

As previously described the relative position of the assembly is communicated to the video game by means of potentiometers P1 and P2, the output of each being connected to a digital/analog converter located in the computer of the video game assembly. An example of a commercially available computer containing such converter as one of its input/output devices is the Radio Shack TRS-80 Color Computer. The Technical Reference Manual for this computer describes the digital/analog converter at page 30 and its usage with a "joystick" interface circuitry at page 40. The joystick circuitry for use with the TRS-80 employs potentiometers having an output voltage range of 0 to 5 volts, and is represented schematically at Page 40 of the manual. Potentiometer P1 requires 360 degrees of rotation while potentiometer P2 requires somewhat less rotation.

Using the TRS-80, each tenth of a volt on the "wiper" contact of potentiometer P1 represents an incremenet of 7.2 degrees of azimuth. A voltge of 2.5 on potentiometer P1 would correspond to an azimuth position of 180 degrees from the starting position of 0 degrees. Potentiometer P2 measures tilting movements of the assembly in an arc of 90 degrees disposed in a vertical plane. or altitude. Since the maximum arc of tilting movements is one-fourth of a circle, The "wiper" contact of potentiometer P2 would describe an arc of not more than 90 degrees. Therefore potentiometer P2 could be a 5 volt potentiometer with its variable resistance describing any arc equal to or greater than 90 degrees. Assuming the wiper of potentiometer P2 moves through 270 degrees, the maximum voltage range available by tilting of assembly 32 through an arc of 90 degrees would be one-third of five, or 1⅔ volts. A voltage of 1.0 on P2 would represent an altitude of 54 degrees above the horizontal (Alternatively a set of gears used in connection with potentiometer P2 could translate an arc of 90 degrees traveled by the chair and assembly in the vertical plane into an arc of 270 degrees for the "wiper" contact of potentiometer P2, thereby utilizing more of the available voltage range of the potentiometer). The digital/analog converters in the video game unit change the input from the potentiometers into digital input for the video game. The video game would employ a program with a permanent list of perhaps 200 pairs of coordinates, such as 180 degrees for P1 and 45 degrees for P2. This would be interpreted by the program to show the target on the screen, at 180 degrees of azimuth and 45 degrees of altitude.

In one type of game suitable for my invention, the computer instructs the computer to select the pair of coordinates that is next on a list of coordinates. The target will appear as a "blip" on a part of the screen in a postion indicated by the coordinates. The operator, in order to destroy the target, is required to pedal until his chair and assembly are rotated to a position in which a weapon reticle matches the azimuth coordinate of the target, and at the same time, the operator is required to pump back or forth on the handlebar(s) until the chair and assembly are tilted into a position where the weapon reticle matches the altitude of the target. When the azimuth and altitude of the operator's weapon are read by the computer to match that of the screen target, a visual image of a reticle centered on a target iamge will appear on another part of the screen and the operator may shoot the target by pressing the trigger. The image then disappears from the screen and a new "blip" appears on the screen, representing the next pair of coordinates from the list.

While the preferred embodiment of my invention describes a plurality of spaced wheels 18 as the means by which the ring-shaped member 16 rotates upon the mounting base 12, alternative means are envisioned. Circular races of equal size and diameter could be installed on the mounting base 12 and on the bottom of ring-shaped member 16, which member would be rotatably supported on ball bearings traveling within the races. Or in lieu of the ring-shaped member 16 and wheels 18, the assembly 32 could be rotatably supported on the centrally located vertical member 14 using a large ball bearing and hub. It is contemplated that a person skilled in the art may devise various equivalent means of accomplishing other featurs of my invention, such as the conversion of information about the leg and arm movements of the operator into input influencing the video game.

I claim:

1. An exercise apparatus for use in combination with a video game comprising:
   a. a stationary base member disposed in a generally horizontal plane;
   b. an assembly movably mounted on said base member, including (i) a seat for an operator and (ii) support means for mounting a video game facing said seat, said assembly being movable with respect to said base member in a plurality of directions;
   c. mounting means intermediate said base and said assembly to permit said assembly to be moved relative to said base, said mounting means including a rotatable framework for supporting said assembly, said mounting means permitting 360 degrees of horizontal rotation of said framework and assembly in either of two opposing directions about a vertical axis centered on said base member;
   d. operator-powered drive means for moving said assembly with respect to said base member, said drive means including a foot-operated crank wherein pedalling of the crank by the operator in a forward direction casues said framework and assembly to move in one direction, and pedalling backward causes said assembly to move in an opposing direction, such movement requiring vigorous exercise by said operator; and
   e. electrical sensing means connected to said mounting means responsive to the direction and extent of movements of said assembly with respect to said base member, for transmittal of information related to said movements to said video game.

2. An exercise apparatus for use in combination with a video game comprising:
   a. a stationary base member disposed in a generally horizontal plane;
   b. an assembly movably mounted on said base member, including (i) a seat for an operator and (ii) support means for mounting a video game facing said seat, said assembly being movable with respect to said base member in a plurality of directions;
   c. mounting means intermediate said base and said ssembly permitting horizontal rotation of said assembly through 360 degrees in either of two opposing directions relative to said base and tilting of said assembly through a vertical arc in either of two opposing directions with respect to said base member, said mounting means includes a rotatable ring-shaped member equipped with friction-reducing means between it and said base member facilitating rotation of said ring-shaped member with respect to said base member, said ring-shaped member pivotably supporting said assembly to permit tilting of said assembly with respect to said ring-shaped member.

d. operator-powered drive means for rotating and tilting said assembly with respect to said base member, such movement requiring vigorous exercise by said operator; and e. electrical sensing means connected to said mounting means responsive to the direction and extent of rotation and tilting of said assembly with respect to said base member, for transmittal of information related to said movements to said video game.

3. The exercise apparatus according to claim 2 wherein said operator-powered drive means includes:

a. a foot-operated crank assembly wherein pedalling by the operator in a forward direction causes said assembly to rotate upon said base member in one direction, and pedalling backward causes said assembly to rotate in the opposite direction, and b. a fixed lever with a handlebar attached to said rotatable ring-shaped member disposed so that said operator may tilt said assembly in one direction with respect to said rotatable ring-shaped member by pushing on said handlebar, and in the opposite direction by pulling on said handlebar.

* * * * *